United States Patent [19]

Davis

[11] 4,314,159

[45] Feb. 2, 1982

[54] DOCUMENT SCANNER

[75] Inventor: James W. Davis, Richardson, Tex.

[73] Assignee: The Mead Corporation, Dayton, Ohio

[21] Appl. No.: 154,675

[22] Filed: May 30, 1980

[51] Int. Cl.³ .......................................... G01N 21/30
[52] U.S. Cl. .............................. 250/561; 250/237 G; 358/289; 358/293
[58] Field of Search .................. 250/561, 237 G, 216; 356/386, 387; 358/289, 293

[56] References Cited

U.S. PATENT DOCUMENTS

| | | |
|---|---|---|
| 2,220,736 | 11/1940 | Stockbarger et al. |
| 2,530,516 | 11/1950 | Finch |
| 2,994,072 | 7/1961 | Woody |
| 3,439,176 | 4/1969 | Astley et al. |
| 3,500,055 | 3/1970 | Russell et al. |
| 3,684,890 | 8/1972 | Hayne et al. |
| 3,793,508 | 2/1974 | Maggi |
| 4,060,907 | 12/1977 | Van Hook |
| 4,163,157 | 7/1979 | Guignard et al. |
| 4,171,744 | 10/1979 | Hubbard |

Primary Examiner—David C. Nelms
Assistant Examiner—Darwin R. Hostetter
Attorney, Agent, or Firm—Biebel, French & Nauman

[57] ABSTRACT

A scanner for scanning a document positioned against a backing surface to determine the position of the document includes photoelectric transducers which provide electrical scan signals in dependence upon the light reflected from the document and from the backing surface at a plurality of moving scan positions as the scan positions move across both the document and the backing surface. A recognizable background image is defined on the document backing surface such that the photoelectric transducers provide a recognizable pattern of scan signals as the document backing surface is scanned, thereby indicating the position of the document. The recognizable background pattern may include a plurality of stripes on the document backing surface with the stripes extending substantially parallel to the direction of movement of the scan positions. Alternatively, the recognizable background pattern may include a plurality of stripes which extend substantially perpendicular to the direction of movement of the scan positions. Alternate ones of the stripes may be black with intermediate ones of the stripes being white. A circuit means may be provided for detecting the recognizable pattern of the scan signals.

20 Claims, 9 Drawing Figures

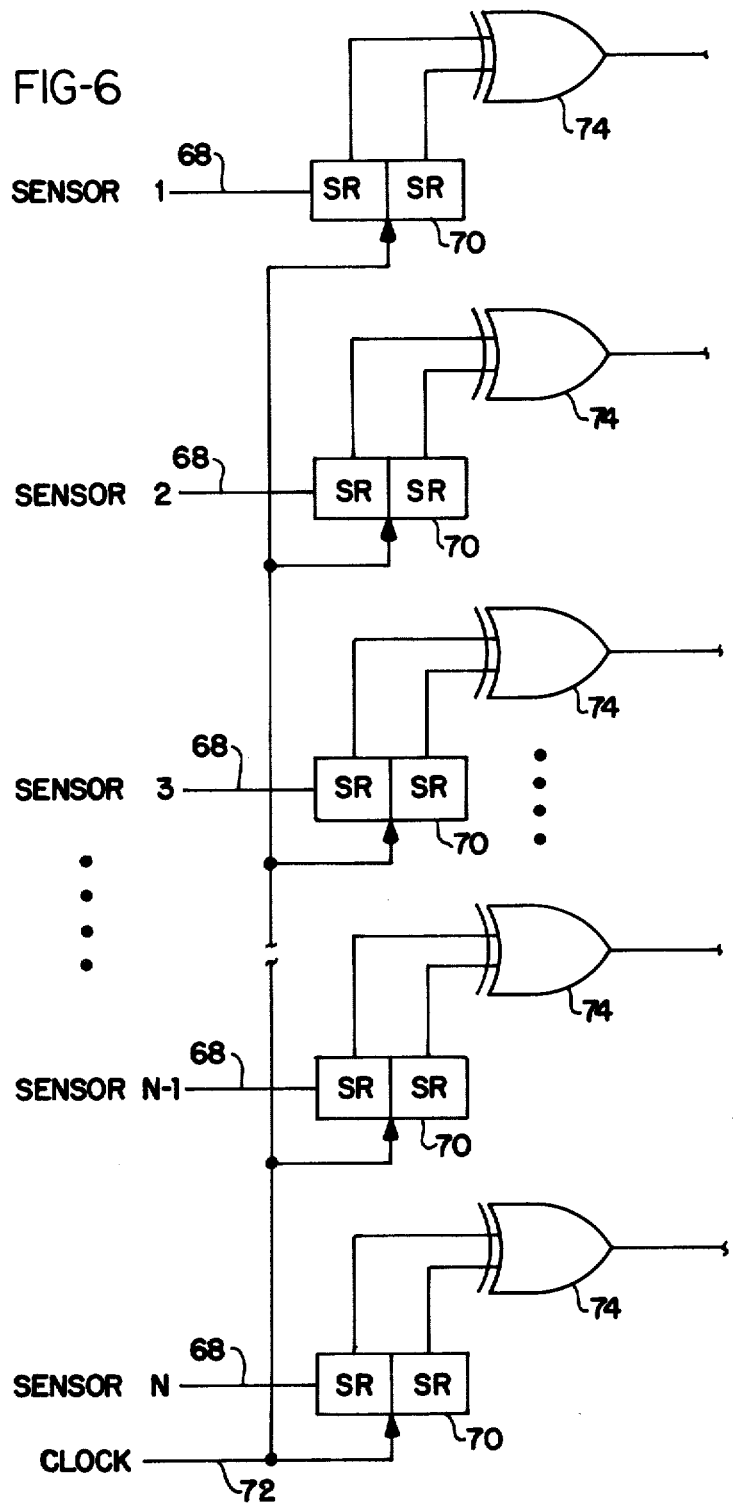

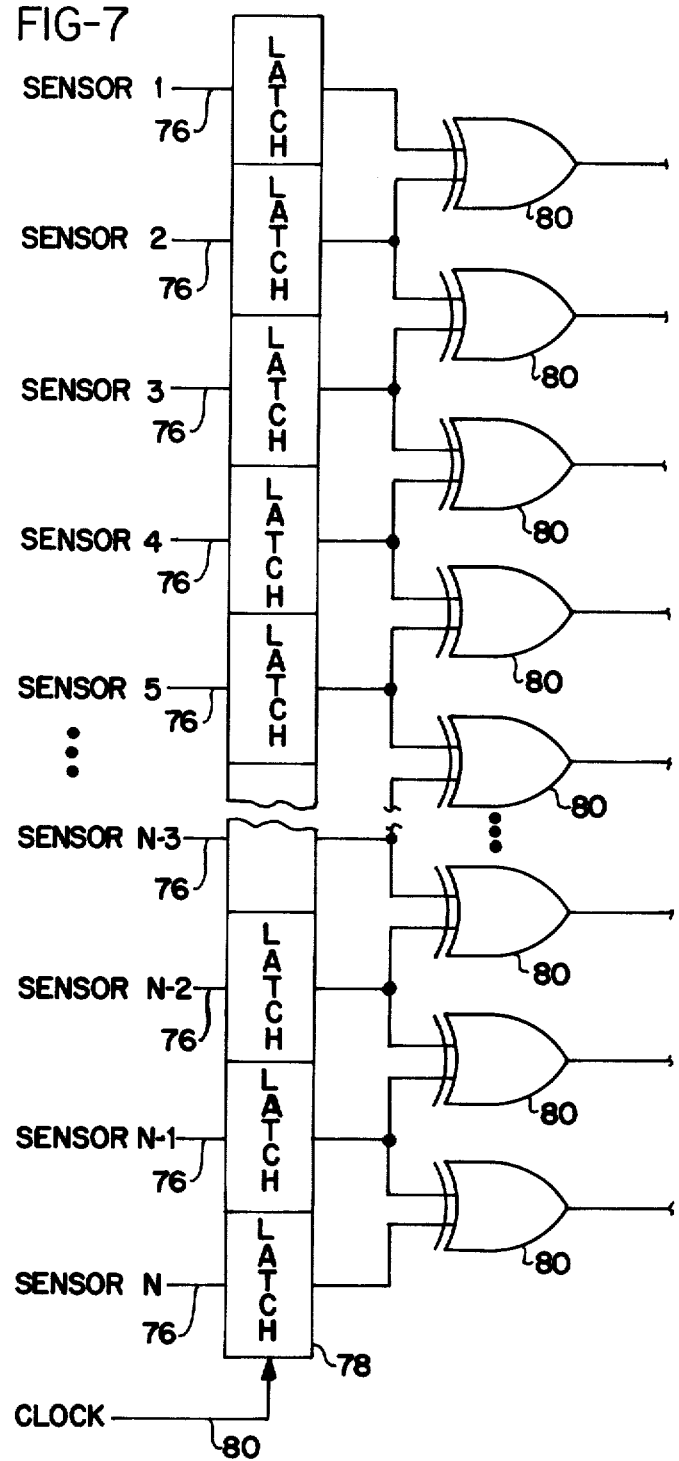

DOCUMENT SCANNER

BACKGROUND OF THE INVENTION

The present invention relates to a document scanning device for producing electrical scan signals representative of an image on a document at moving scan points which are moved along corresponding scan lines across the document image. More particularly, the present invention relates to such a scanner in which the document is mounted on a document supporting backing surface and transported past a scanning station defined by the scan points, with the scan signals produced by scanning the document being distinguishable from the scan signals produced by scanning the backing surface. To produce such distinguishable scan signals, the document backing surface bears a characteristic image pattern which produces a recognizable scan signal pattern when the backing surface is scanned.

A document image is scanned to produce electrical scan signals representative of the document image in various types of devices, such as facsimile systems and document duplicator systems. In a number of prior art duplicator systems, the document to be copied is manually placed on a document supporting platen in registration with positional indicia. The document is then optically scanned on the assumption that it is properly positioned. Other prior art duplicator systems, which automatically feed an original document to a scanner, utilize relatively intricate mechanical document handling arrangements to produce proper registration between the document image and the scanner system. Typically, scanning is performed on the assumption that the mechanical registration apparatus has positioned the document appropriately. If a document is mispositioned, however, this may go undetected and the duplicated copy will bear an image which is laterally or longitudinally shifted or skewed with respect to the sheet of copy paper.

While a number of prior art devices have utilized photoelectric detectors to detect the presence or position of a document at a scanning station, or the presence or position of a sheet of paper at a printing station, such devices have detected only the difference between light reflected from a document supporting or backing surface and the document itself. Where documents of varying color and reflectivity are to be scanned, however, it will be appreciated that some documents may have an image adjacent an edge of the document which is substantially the same color or reflectivity as the document backing surface. When this occurs, scanning across the document backing surface and onto the document surface will not result in a substantial change in the amount of light received by the photoelectric detectors and, as a result, the document edge will not be detected.

U.S. Pat. No. 4,060,907, issued Dec. 6, 1977, to Van Hook discloses a printer including a circuit for providing an indication of the location of a sheet of copy paper, mounted on a rotating paper-supporting drum, in which a pair of photoelectric detectors provide signals coincident with the circumferential and axial edges of the sheet of paper. These signals are used to control counters which generate a preset or offset signal value and a gate signal to accommodate axial and circumferential misalignment of the sheet on the drum.

The drum surface is apparently uniformly reflective, with the assumption being made that the sheet of copy paper has a lower reflectivity. Since the sheet of copy paper, prior to printing, bears no print image, the reflectivity of the paper is known and, therefore, the reflectivity of the drum surface can be selected such that there is a substantial difference in the amount of light reflected to the photoelectric detectors from the drum surface and from the surface of the sheet.

Similarly, U.S. Pat. No. 3,684,890, issued Aug. 15, 1972, to Hayne et al, discloses a misfeed detector for sensing the presence of a properly fed sheet prior to the sheet being conveyed to the photoconductive surface of a xerographic machine for transfer of a developed image thereto. A photocell system includes photosensors which detect the reflection of light from an area on a sheet supporting drum where a properly oriented sheet would be positioned. If a misfeed of the sheet is detected, the xerographic machine is shut down. As in the case of the Van Hook device, the misfeed detector of Hayne et al is operable successfully only where a sheet of known reflectivity is scanned.

U.S. Pat. No. 4,171,744, issued Oct. 23, 1979, to Hubbard, discloses a device which photoelectrically scans mixed mail pieces to classify the mail pieces into size and orientation categories for subsequent sorting operations. The apparatus includes a laser beam which scans a conveying belt upon which the documents are transported. Hubbard suggests using a dark nonreflective belt for transporting the letters past the scanning station. It will be appreciated, however, that if a mail piece were to be of a dark color, or a mail piece were to have a portion of its surface printed with dark ink, the scanning system would not provide an accurate indication of the size or orientation of the mail piece.

U.S. Pat. No. 3,439,176, issued Apr. 15, 1969, to Astley et al, discloses a web registration system in which a series of identical images are printed along a web with a black mark being printed in the white space between each of the images. Scanners detect the movement of a white space therepast, followed by the black mark, followed by a second white space, and this detection is utilized to control subsequent printing, folding or cutting of the web. U.S. Pat. No. 2,220,736, issued Nov. 5, 1940, to Stockbarger et al, discloses a photo-optical detector in which a series of transverse marks on a moving web are detected by a pair of photo-optical transducers. The Stockbarger et al device requires that the web have a periodically repeating pattern printed thereon. The web illumination is strobiscopic in nature and is synchronized to the speed of movement of the web.

It is seen, therefore, that a need exists for a scanning system capable of detecting the position of a document being scanned with high reliability and without regard to the document image or the reflectivity of the document.

SUMMARY OF THE INVENTION

A scanner for scanning an image on a document along a plurality of scan lines to produce electrical scan signals related to the image includes means defining a document backing surface against which the document is placed for scanning of the image. A scanner means provides scan signals related to the image at a plurality of moving scan positions which move across the image and the document backing surface. A recognizable background image is defined on the document backing surface such that the scanner means provides scan signals of a recognizable pattern as the document backing surface is scanned.

The means defining a recognizable background image defines a plurality of stripes on the document backing surface. The stripes may extend parallel to the direction of movement of the scan positions or, alternatively, may extend substantially perpendicular to the direction of movement of the scan positions. The stripes may be arranged with alternate stripes being black and intermediate stripes being white.

The scanner may further comprise circuit means, responsive to the scan signals, for detecting the recognizable pattern of the scan signals, which pattern indicates scanning of the document backing surface.

The scanner may include a document supporting drum which defines a document supporting surface for receiving a document to be scanned and for supporting the document. As the drum is rotated, the document is transported past a document scanning station. The document supporting surface thus acts as the document backing surface, and the recognizable background pattern is defined thereon.

Accordingly, it is an object of the present invention to provide a scanner for scanning a document positioned against a document backing surface to provide electrical scan signals which may be differentiated as to whether they are produced by scanning the backing surface or the document; to provide such a scanner in which the backing surface bears a recognizable image pattern so as to produce the recognizable pattern of scan signals; to provide such a scanner in which the backing surface bears a plurality of stripes; to provide such a scanner in which the stripes extend across the backing surface in a direction substantially perpendicular to the scan direction; alternatively, to provide such a scanner in which the stripes extend substantially parallel to the scan direction; and to provide such a scanner in which the stripes are alternately white and black.

Other objects and advantages of the invention will be apparent from the following description, the accompanying drawings and the appended claims.

BRIEF DESCRIPTION OF THE DRAWINGS

FIG. 6 is a schematic representation of a circuit which may be used in conjunction with the scanner of FIG. 1; and FIG. 7 is a schematic representation of a circuit which may be used in conjunction with the scanner of FIG. 4.

DETAILED DESCRIPTION OF THE PREFERRED EMBODIMENTS

Figure 1:
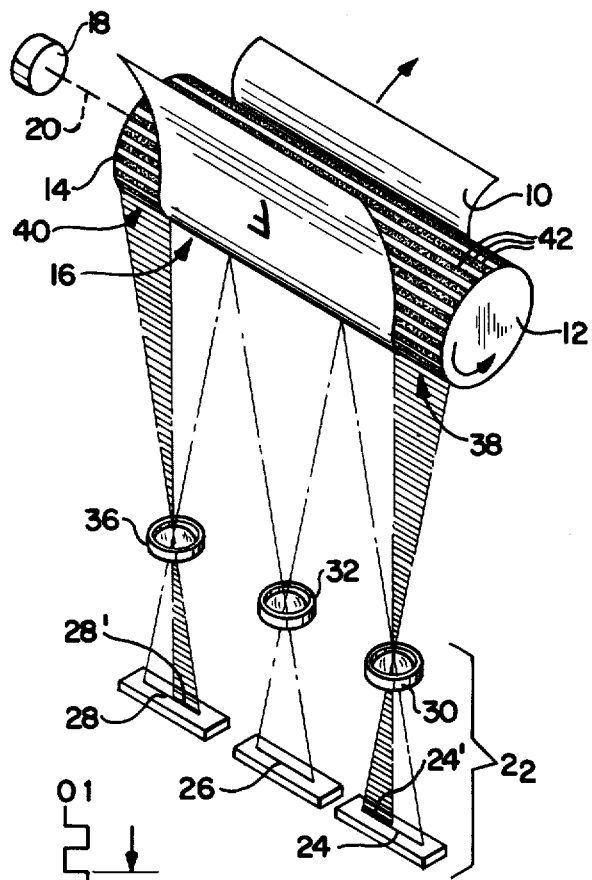
FIG. 1 is a perspective view of a first embodiment of the present invention.

The present invention relates to a document scanner and, more particularly, to a scanner in which scan signals produced as a result of scanning the document and scan signals produced as a result of scanning a document backing surface may be differentiated, and the location of the document precisely determined. FIG. 1 of the drawings illustrates a first embodiment of the image scanner of the present invention for scanning an image on document 10. The scanner includes a document supporting drum 12 which defines a document supporting backing surface 14 against which the document 10 is placed, and upon which the document 10 is supported.

The document 10 is supplied to the drum 12 by document feed apparatus of conventional design (not shown). The document 10 is loaded onto the drum and transported thereby past a document scan station, indicated generally at 16. A means for rotating the drum 12 such that the document 10 is transported past the document scan station 16 includes a motor 18 connected to drum 12 by a suitable drive linkage 20. The drum 12 is rotated at a substantially uniform speed such that the document backing surface 14 and the document 10 are transported past the scan station 16 at a substantially uniform velocity.

A scanner means 22 provides electrical scan signals in dependence upon the light reflected from the document 16, including the print image thereon, and the backing surface 14 at a plurality of scan points which are positioned in a row along the scan station 16. As the drum 12 is rotated with the document 10 thereon, the scan points or positions are moved along parallel scan lines across the document and across the backing surface 14. The spacing between centers of adjacent scan points corresponds to the spacing between the center points of adjacent pixels into which the document image is effectively divided by the scanner. The scanner means includes a plurality of photoelectric transducers, positioned along transducer lines 24, 26, and 28, which transducers each provide a scan signal in response to the amount of light received thereby. An optical means, including lens arrangements 30, 32, and 36, directs light from each of the plurality of scan points at the scan station 16 to an associated one of the photoelectric transducers positioned along transducer lines 24, 26, and 28. Thus the row of transducers define a corresponding row of scan positions which extend generally axially along the length of the drum 12. The scan positions in portions 38 and 40 of the row are laterally offset with respect to the document 10. As a result, the photoelectric transducers in transducer line portions 24' and 28' receive light reflected from the document backing surface 14, rather than from the document 10. If documents of only one width were to be scanned by the scanner and, further, if these documents were always loaded onto the drum 12 in precise axial alignment, the photoelectric transducers along transducer line portions 24' and 28' would not be needed, since they would receive light reflected only from the backing surface 14.

In a practical document feeding arrangement, however, exact positioning of the documents on the document supporting drum is not possible. Furthermore, relatively accurate mechanical document supply systems for successively loading documents onto drum 12 are complicated, costly, and subject to malfunction. In order to eliminate the need for such complicated document supply arrangements, while at the same time providing for accurate scanning of the document image, means are provided defining a recognizable background pattern or image on the document backing surface 14. The scan signal pattern produced by the photoelectric transducers in transducer line portions 24' and 28' may be recognized by appropriate circuitry as indicating scanning of the document backing surface 14. These recognizable scan signals may be ignored or, if desired, processed to produce an indication of the precise location and orientation of the document being scanned.

Figure 3:
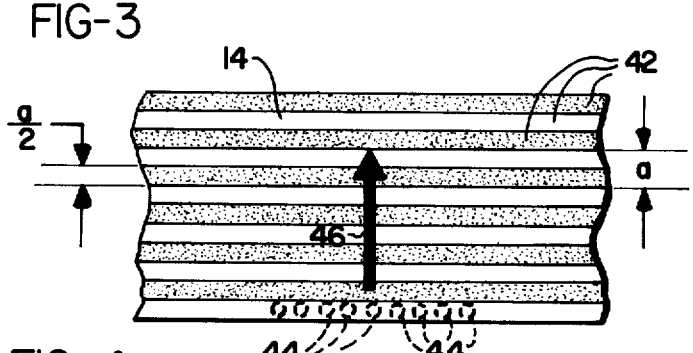
FIG. 3 is an enlarged portion of the surface of the drum of FIG. 1.

As seen in FIG. 1, the recognizable background image in this embodiment defines a plurality of stripes 42 which are substantially perpendicular to the direction of movement of the scan positions; that is, the stripes extend substantially axially along the surface 14 of the drum 12. As seen in FIG. 3, the photoelectric transducers receive light reflected from scan points 44 as the scan points move across the successive black and white stripes 42 on the backing surface 14 in a direction indicated by the arrow 46. The transducers therefore provide scan signals of a frequency related to the width a of pairs of stripes 42 and also related to the velocity of the scan points across the surface 14. Each of the photoelectric transducers provides a pulse train of a frequency V/a, where V is the velocity of the document backing surface 14 with respect to the scan positions 44. This frequency is substantially constant during scanning of the backing surface 14 since the velocity of the drum 12 remains relatively constant to prevent image distortion.

Figure 2A:
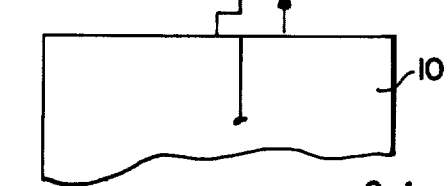
FIGS. 2(a)-2(c) are schematic representations of the scanning technique by which the embodiment of FIG. 1 operates.

The output of a selected photoelectric transducer as its scan point moves across the backing surface 14 and over the leading edge of a document 10, onto the document surface, is illustrated diagrammatically in FIG. 2(a). Note that the scan signal fluctuates between a first level, indicated as "0", when a black stripe is being scanned and a second level, indicated as "1", when a white stripe is being scanned. The period of the scan signal is directly proportional to the distance a, the width of a pair of stripes. As the scan point moves over the leading edge of the paper 10 and onto the white document surface, the pulse train is terminated and the scan signal assumes a constant 1 level. This scan signal will then fluctuate in dependence upon the image density of the document image. As a consequence, a frequency detection circuit may be utilized to distinguish between the constant frequency pulse train indicating scanning of the document backing surface 14 and the fluctuating scanning signal produced by the transducer as the document 10 is scanned. It is extremely unlikely that a scan signal produced by scanning the document image would have a frequency equal to that produced by scanning the backing surface. Only if a series of black-to-white and white-to-black transitions, spaced apart by a distance a/2, are encountered on the document image would the scan signal produced by scanning the backing surface be simulated.

Figure 2B:
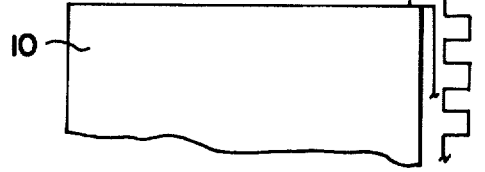

FIG. 2(b) illustrates the manner in which the position of an edge of the document 10, parallel to the direction of scan, is determined. Note that the scan signal pulse train 47 terminates when the transducer producing this pulse train receives light from a scan point which passes over the leading edge of the document 10 and along the side edge thereof. The pulse train 48, however, from the adjacent scanner continues to oscillate, indicating the position of the lateral document edge.

Figure 2C:
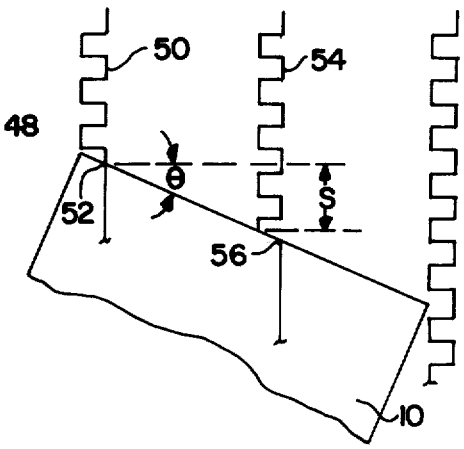

As seen in FIG. 2(c), the scan signals from the scanner of the present invention may also be utilized to determine the skew of a document with respect to the direction of scan. Note that the pulse train 50 terminates as the scan point moves over the leading edge of the document at 52, while the scan signal pulse train 54 is not terminated until the scan point scanned by the transducer producing this scan signal passes over the leading edge of the document at 56. By counting the number of pulses produced in the scan signal pulse train 54 after termination of the pulse train in scan signal 50, and assuming that the lateral displacement between the scan points from which light is received by the transducers producing these scan signals is known, the angle of skew, $\theta$, may be determined.

Figure 4:
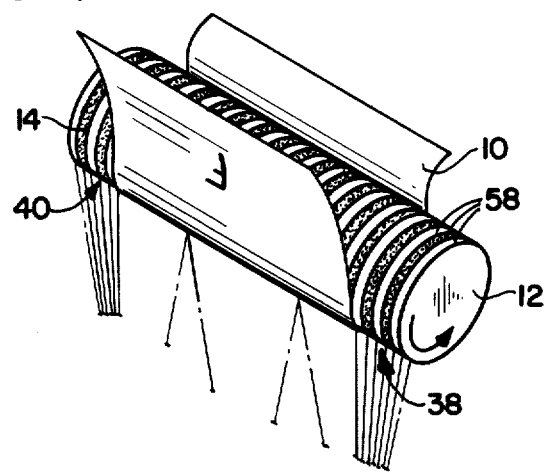
FIG. 4 is a partial perspective view of a second embodiment of the scanner of the present invention.

FIG. 4 illustrates a second embodiment of the present invention in which the stripes 58 extend circumferentially around the drum 12. The scanner means corresponds to that illustrated in FIG. 1 of the drawings. A number of the photoelectric transducers receive light from portions 38 and 40 of the row of scan positions extending across the drum 12. Since circumferentially extending stripes 58 alternate in color between black and white and, further, since these stripes are preferable of the same width as the spacing between scan position centers, transducers scanning portions 38 and 40 provide constant scan signals which alternate along the row between 1 and 0 levels.

Figure 5:
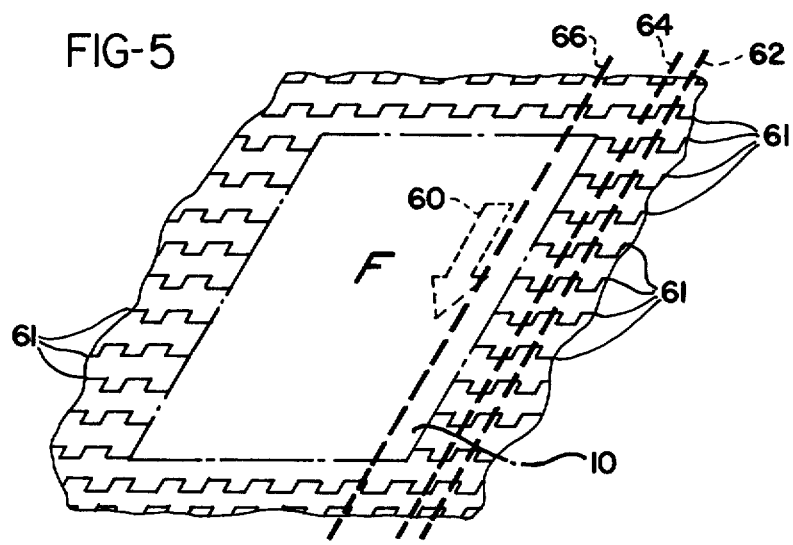
FIG. 5 is a schematic representation of the scanning technique utilized by the scanner of FIG. 4.

This is illustrated in FIG. 5 in which arrow 60 indicates the direction of scan of the document 10. Each of the diagrammatically illustrated lines 61 represents the transducer outputs at a given point in time. Note that the transducer receiving light from the scan point moving along scan line 62 has a continuous high output scan signal while the transducer receiving light from the scan point moving along scan line 64 has a continuous low or 0 output scan signal. The photoelectric transducer receiving light from the scan point moving along scan line 66 is continuously high until the scan point passes over the leading edge of the document 10. At this time, the scan signal will vary in dependence upon the print image density on the document. Subsequently, as the scan point moves over the trailing edge of the document 10, the continuous high output scan signal will be resumed.

It should be understood, however, that although a stripe width corresponding to the spacing between adjacent scan positions is illustrated, the circumferentially extending stripes may be substantially wider if desired. In such a case, a group of transducers would receive light reflected from a white stripe, while adjacent groups of transducers would receive light reflected from the adjacent black stripes. It will be appreciated that such an arrangement may be utilized where less precision is required in determining the position of the lateral edges of the document 10.

FIG. 6 illustrates a circuit means which is responsive to the scan signals for detecting the recognizable pattern of scan signals indicating scanning of the document supporting surface of the scanner of FIG. 1. The circuit receives scan signals on lines 68 from the transducers 1 through n. These scan signals have been previously processed such that only "1" and "0" level signals, indicating scanning of white and black image areas, respectively, are included. It should be noted that the transducers are numbered as to the position of their associated scan points, rather than their physical position in the transducer rows 24, 26, and 28.

The scan signals, previously processed and digitized, are supplied to two-bit shift registers 70 and clocked by a clocking signal on line 72 which has a frequency equal to 2V/a. The clock signal on line 72 therefore causes the scan signals to be shifted into the shift registers 70 at precisely the same rate at which scan points scan across successive black and white lines 42. If a transducer is scanning the backing surface 14, therefore, successive 1's and 0's will be shifted into the associated shift register. The clock signals supplied to line 72 may be derived from any suitable source, such as a tachometer connected to drum 12. The outputs of the shift registers 70 are supplied to respective EXCLUSIVE OR gates 74. EXCLUSIVE OR gates 74 provide binary 1 outputs as long as their associated transducers are scanning the backing surface 14. When, however, the transducers scan the document 10, the associated EXCLUSIVE OR gates provide binary 0 outputs.

While a momentary 1 output may be provided by an EXCLUSIVE OR gate as a transition from white to black or black to white is encountered during scanning of a document, additional circuitry may be provided to detect when such a condition occurs without a corresponding 1 output being provided by adjacent EXCLUSIVE OR gates. Additionally, circuitry may be provided to recognize a binary 1 output as providing a valid indication of scanning of the backing surface only when the 1 output persists for a predetermined time period.

FIG. 7 illustrates a circuit which may be used in conjunction with the scanner of FIG. 4. As was the case with the circuit of FIG. 6, the transducer outputs are numbered 1 through n with the numbering corresponding to the positions of the scan points from which the respective transducers receive reflected light. It will be appreciated that where the center lines of adjacent circumferentially extending stripes are spaced apart by a distance equal to the spacing between the centers of adjacent scan points, scanning of the document backing surface will result in alternate transducers scanning along black stripes with the intermediate transducers scanning along white stripes. As a consequence, the digitized input signals from the transducers supplied to input lines 76 will remain constant during scanning of the backing surface with alternate lines 76 receiving a binary 1 and intermediate lines 76 receiving a binary 0.

The inputs on lines 76 are clocked into one-bit latches 78 by a clock signal on line 80. The frequency of the clock signal is selected to correspond to the desired measurement accuracy. Each of the EXCLUSIVE OR gates 80 receives inputs from adjacent photoelectric transducers. As a consequence, an EXCLUSIVE OR gate 80 provides a binary 1 output only when the adjacent photoelectric transducers to which it responds produce signals corresponding to scanning a black area adjacent a white area. The higher the frequency of the clock signal on line 80, the greater number of samples which are clocked into latches 78, and as a consequence, the greater the accuracy of the positional measurement of the document position.

It will be appreciated that an individual pair of transducers may provide such scan signals during scanning of the document image. In order to distinguish such a spurious indication from a true indication of scanning the background surface, further processing circuitry may be used to provide an indication of scanning the backing surface only when a 1 output is received from an EXCLUSIVE OR gate for a predetermined period of time. Additionally, such circuitry may recognize a binary 1 output as an indication of scanning the backing surface only when this binary 1 output is received from an EXCLUSIVE OR gate and the adjacent EXCLUSIVE OR gates simultaneously.

With the embodiment of FIG. 1, the position of the leading and trailing edges of the document is determined by the cessation and initiation of the pulse trains produced by scanning across the black and white stripes. As a consequence, the narrower the stripes, the higher the frequency of the pulse train, and the greater accuracy with which the leading and trailing edges can be located. The lateral edges of the document which extend generally in the direction of document scanning are, however, measured to an accuracy which is determined by the lateral spacing of the scan positions at the scan station. Similarly, with the embodiment of FIG. 4 the measurement accuracy of the position of the lateral edges of the document is determined by the width of the circumferentially extending black and white stripes, although it will be appreciated that this measurement can be no more accurate than the lateral spacing between adjacent scan positions. The measurement of the location of the leading and trailing edges in the embodiment of FIG. 4 is a function of the frequency at which the photoelectric transducer scan signal outputs are checked for recognition of the recognizable scan signal pattern.

While the forms of apparatus herein described constitute preferred embodiments of the invention, it is to be understood that the invention is not limited to these precise forms of apparatus, and that changes may be made therein without departing from the scope of the invention.

What is claimed is:

1. An image scanner for scanning a document to produce electrical scan signals representative of an image on the document along a plurality of parallel scan lines, comprising:
   a document supporting drum, defining a document supporting surface, for receiving a document to be scanned and supporting said document on said surface,
   means for rotating said drum such that said document supported thereby is transported past a document scanning station,
   a plurality of photoelectric transducers, each of said transducers providing a scan signal in response to light received thereby,
   optical means for directing light from each of a plurality of scan points at said scanning station to an associated one of said photoelectric transducers, whereby each of said scan points defines a scan line as said document is transported past said scanning station, and
   means on said document supporting surface of said drum defining a recognizable background pattern, whereby a recognizable pattern of scan signals from said transducers is produced during scanning of said document supporting surface.

2. The scanner of claim 1 in which said means defining said recognizable background pattern defines a plurality of stripes on said document supporting surface.

3. The scanner of claim 2 in which said stripes extend circumferentially around said drum.

4. The scanner of claim 2 in which said stripes extend substantially axially along said drum.

5. The scanner of claims 3 or 4 in which alternate stripes are black and intermediate stripes are white.

6. The scanner of claim 1 further comprising circuit means, responsive to said scan signals, for detecting said recognizable pattern of scan signals indicating scanning of said document supporting surface.

7. A scanner for scanning an image on a document along a plurality of scan lines to produce electrical scan signals related to the image, comprising:

means defining a document backing surface against which said document is placed for scanning of said image, scanner means for providing scan signals in dependence upon the image at a plurality of moving scan positions, said positions being moved across said image and said document backing surface along associated ones of said scan lines, and means defining a recognizable background image on said document backing surface, whereby said scanner means provides scan signals of recognizable pattern as said document backing surface is scanned.

8. The scanner of claim 7 in which said means defining a recognizable background image defines a plurality of stripes on said document backing surface.

9. The scanner of claim 8 in which said stripes on said document backing surface extend parallel to the direction of movement of said scan positions.

10. The scanner of claim 8 in which said stripes on said document backing surface extend substantially perpendicular to the direction of movement of said scan positions.

11. The scanner of claims 9 or 10 in which alternate stripes are black and intermediate stripes are white.

12. The scanner of claim 7 further comprising circuit means, responsive to said scan signals, for detecting said recognizable pattern of said scan signals, which pattern indicates scanning of said document backing surface.

13. A scanner for scanning a document positioned against a backing surface to determine the position of said document, comprising:

means defining a document backing surface, scanner means for providing electrical scan signals in dependence upon the light reflected from said document and said backing surface at a plurality of scan positions, said scan positions being moved across said document, and means defining a recognizable background image on said document backing surface, whereby said scanner means provides scan signals of recognizable pattern as said document backing surface is scanned such that the position of said document may be determined.

14. The scanner of claim 13 in which said means defining a recognizable background image defines a plurality of stripes on said document backing surface.

15. The scanner of claim 14 in which said stripes on said document backing surface extend substantially parallel to the direction of movement of said scan positions.

16. The scanner of claim 14 in which said stripes on said document backing surface extend substantially perpendicular to the direction of movement of said scan positions.

17. The scanner of claims 15 or 16 in which alternate ones of said stripes are black and intermediate ones of said stripes are white.

18. The scanner of claim 13, further comprising circuit means, responsive to said scan signals, for detecting said recognizable pattern of said scan signals, whereby the location of said document is determined.

19. The scanner of claim 13 in which said means defining a document backing surface comprises a document supporting drum.

20. A method of recognizing a document edge, comprising:

(a) positioning a document in front of a surface bearing a recognizable pattern, (b) scanning said document and said surface bearing said recognizable pattern to produce scan signals in response thereto, and (c) discriminating between signals produced as a result of scanning said recognizable pattern and signals produced as a result of scanning said document, thereby detecting the position of a document edge.

* * * * *